US005579584A

United States Patent [19]

Hoffman

[11] Patent Number: 5,579,584

[45] Date of Patent: Dec. 3, 1996

[54] RETRACTABLE GUARD FOR CIRCULAR SAW

[76] Inventor: Gregory Hoffman, 0140 Sam Grange Ct., Carbondale, Colo. 81623

[21] Appl. No.: 516,302

[22] Filed: Aug. 17, 1995

[51] Int. Cl.[6] .............................. B23D 45/16; B27B 9/00

[52] U.S. Cl. ................................ 30/391; 30/390; 83/478

[58] Field of Search ............................ 30/391, 390, 388; 144/251 R; 83/478; 74/608, 609, 612, 613

[56] References Cited

U.S. PATENT DOCUMENTS

| | | | |
|---|---|---|---|
| 2,722,246 | 11/1955 | Arnoldy | 30/391 |
| 3,410,325 | 11/1968 | Winther | 30/391 |
| 3,613,748 | 10/1971 | De Pue | 30/391 |
| 3,805,639 | 4/1974 | Peter | 30/391 |
| 3,922,785 | 12/1975 | Fushiya | 30/391 |
| 5,129,300 | 7/1992 | Kawakami | 83/478 |

*Primary Examiner*—Hwei-Siu Payer
*Attorney, Agent, or Firm*—William Nitkin

[57] ABSTRACT

A movable saw guard electrically operated by a separate motor which through a gearing system moves the movable saw guard from a closed first position to an open second position upon activation of a switch that is separate from the saw motor's trigger.

8 Claims, 4 Drawing Sheets

RETRACTABLE GUARD FOR CIRCULAR SAW

BACKGROUND OF THE INVENTION

1. Field of the Invention

The device of this invention resides in the area of safety guards for circular power saws and more particularly relates to a movable saw guard.

2. Description of the Prior Art

Manually held circular power saws are frequently equipped with a retractable blade guard disposed beneath the saw blade which substantially encloses the teeth of the lower half of the saw blade that would otherwise be exposed below the base of the saw. The purpose of the guard is to prevent contact of the blade's cutting teeth with fingers or other parts of the person operating the saw. Mounted on such saws is usually a fixed upper saw guard which encloses the upper half of the saw blade. Typically, the upper saw guard is adapted to receive the retractable lower guard as the saw blade engages the material to be cut. The lower guard is then forced in a rearward arc, exposing the blade. When the pressure of the material is removed from the lower guard, a spring returns the lower guard to its original position to re-enclose the teeth of the blade.

At times, however, the lower retractable guard interferes with the operation of the saw. The operator of the saw may encounter situations where the lower guard does not easily retract, making it difficult if not impossible to advance the saw through the material to be cut. To resolve this dilemma, the operator of the saw may use one hand to manually rotate the guard out of the way and hold it in a retracted position. This action causes the operator to only use one hand, instead of two hands, to hold and control the saw and increases the risk of physical harm to the operator from the exposed saw blade.

Prior art devices have been developed to solve this problem. U.S. Pat. No. 2,722,246 to Arnoldy utilizes a solenoid which is energized to swing the saw guard to a retracted position. The guard is returned to its original protective position by a conventional guard return spring mounted on the solenoid plunger when the solenoid is de-energized. U.S. Pat. No. 3,063,481 to Sutherland discloses a saw guard retractor which includes a pivoting lever with a drive wheel powered from the saw motor and adapted to engage the retractable guard upon movement of the lever. The engagement of the drive wheel moves the guard to a retracted position. The activation of a thumb button on the saw handle causes the return of the guard to its protective position. U.S. Pat. No. 3,410,325 to Winther uses magnetic induction to move a retractable saw guard.

SUMMARY OF THE INVENTION

It is an object of the present invention to provide an improved retractable, movable lower blade guard apparatus for a circular power saw.

It is a further object of this invention to provide a movable lower blade guard apparatus which can be rotated out of the way by a plurality of gears driven by a small electric motor.

It is yet a further object of the present invention to provide a movable guard apparatus for a power saw which has an electric activation means to both move the guard away from the saw blade and return the saw guard to its protective original position.

In accordance with the principles of the present invention there is provided a power saw having a movable lower blade guard which in a closed mode first position covers a portion of the lower cutting teeth of the saw blade; and in an open-mode second position exposes the cutting teeth of the saw blade. The movable guard is rotated by a gear mechanism which includes a pair of drive gears and a guard gear which are driven by the above-mentioned electric motor. A manually operated electric activation means which includes a double pole single throw momentary switch and a pair of limit switches drives the electric motor, in an "on" mode, forward to rotate the gears which then move the retractable guard from its blade-guarding first position to its blade-exposing second position. As the movable guard reaches its blade-exposing second position, a limit switch is triggered which opens the electric activation circuit to stop the further rotation of the movable guard. After sawing has been completed free from the interference of the movable guard, the double pole single throw switch can be released. This action reverses the polarity of the current to the small motor, reversing the direction of the motor, driving the guard gear back to its original position and allowing a guard spring to rotate the lower guard back to its closed mode first position which, when reached, triggers a second limit switch, thereby opening the circuit.

DESCRIPTION OF THE PREFERRED EMBODIMENT(S)

Figure 1:
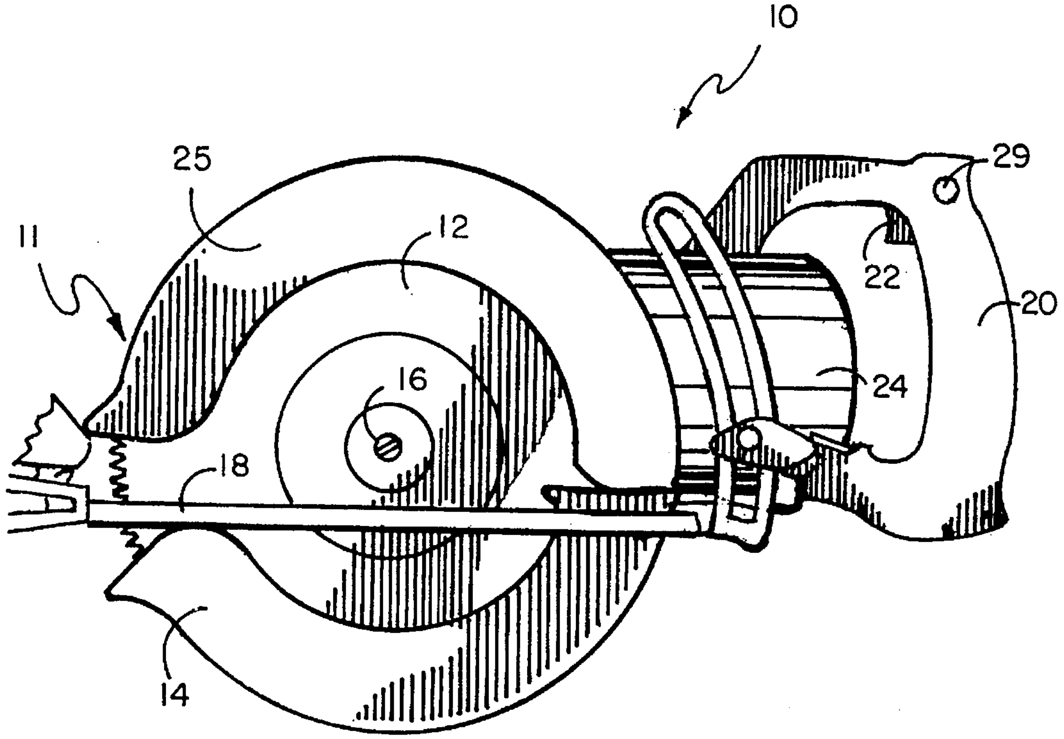
FIG. 1 illustrates a side view of a circular saw, showing the movable guard in its first position.

FIG. 1 illustrates circular power saw 10 of the manually held type. Saw 10 includes main saw assembly 11 mounted to neck 24 and base member 18. Handle 20 extends from neck 24 and includes a trigger 22 to activate the saw. Base member 18 is also mounted to neck 24 and has an opening, not seen, to receive saw blade 12 and movable guard 14 therethrough. Main saw assembly 11 includes fixed guard 25, movable guard 14 and saw blade 12. Fixed guard 25, in a half-circle configuration and generally U-shape in cross-section, covers the upper toothed perimeter of saw blade 12. Fixed guard 25 is positioned to lie above the upper portion of saw blade 12 when the saw blade is secured and axially aligned to rotate on central axis 16 of spindle 17, as seen in FIG. 2.

Figure 6:
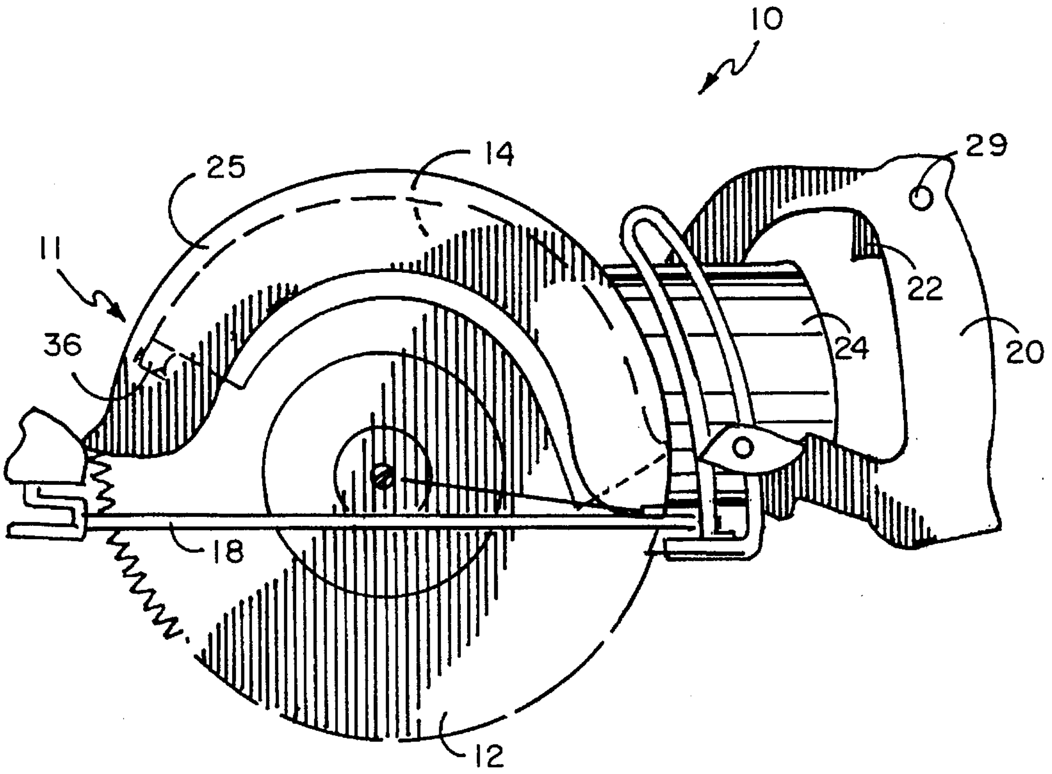
FIG. 6 illustrates a side view of the movable guard in its closed-mode second position.
Figure 7:
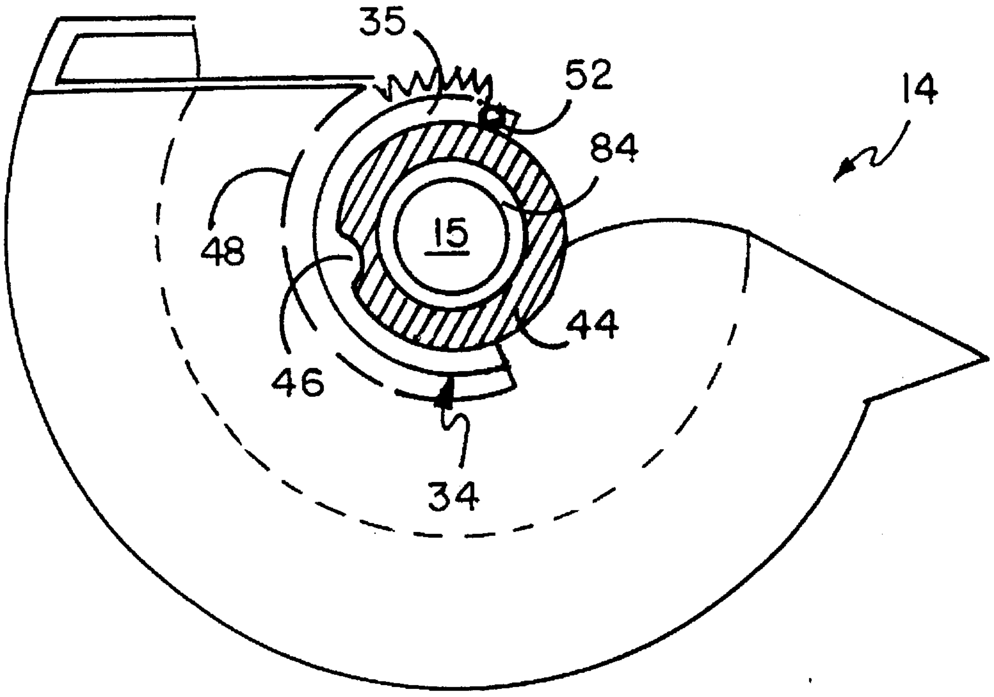
FIG. 7 illustrates a side view of the back of the movable guard with the guard gear in place.

Movable guard 14, shown in its closed-mode first position in FIG. 1, is provided to usually underlie the lower half of circular saw blade 12 that extends beneath base member 18 through a slot therein and cuts the material as power saw 10 is moved forward during operation. Movable guard 14 is arcuate in shape and has a generally U-shaped cross-section to cover the lower toothed perimeter of saw blade 12. Movable guard 14 is capable of fitting within fixed guard 25 when movable guard 14 is rotated to its open-mode second position, as seen in FIG. 6, at desired times during operation of power saw 10. Central opening 15 of movable guard 14, seen in FIG. 7, is axially aligned with central axis 16 of spindle 17, as seen in FIG. 4; and movable guard 14 is rotatably mounted to main saw assembly 11 at central axis 16.

Figure 2:
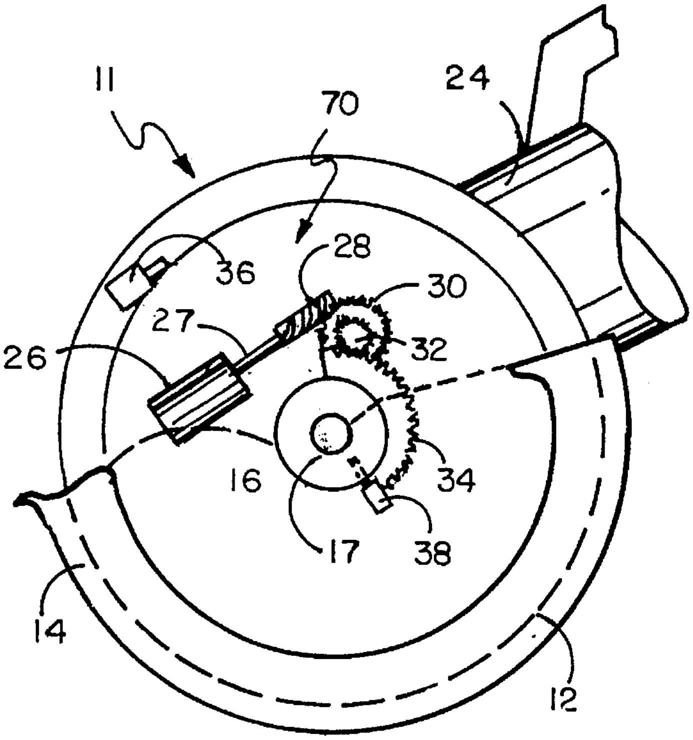
FIG. 2 illustrates a side view of a portion of the circular saw with the blade removed to expose the interior.
Figure 3:
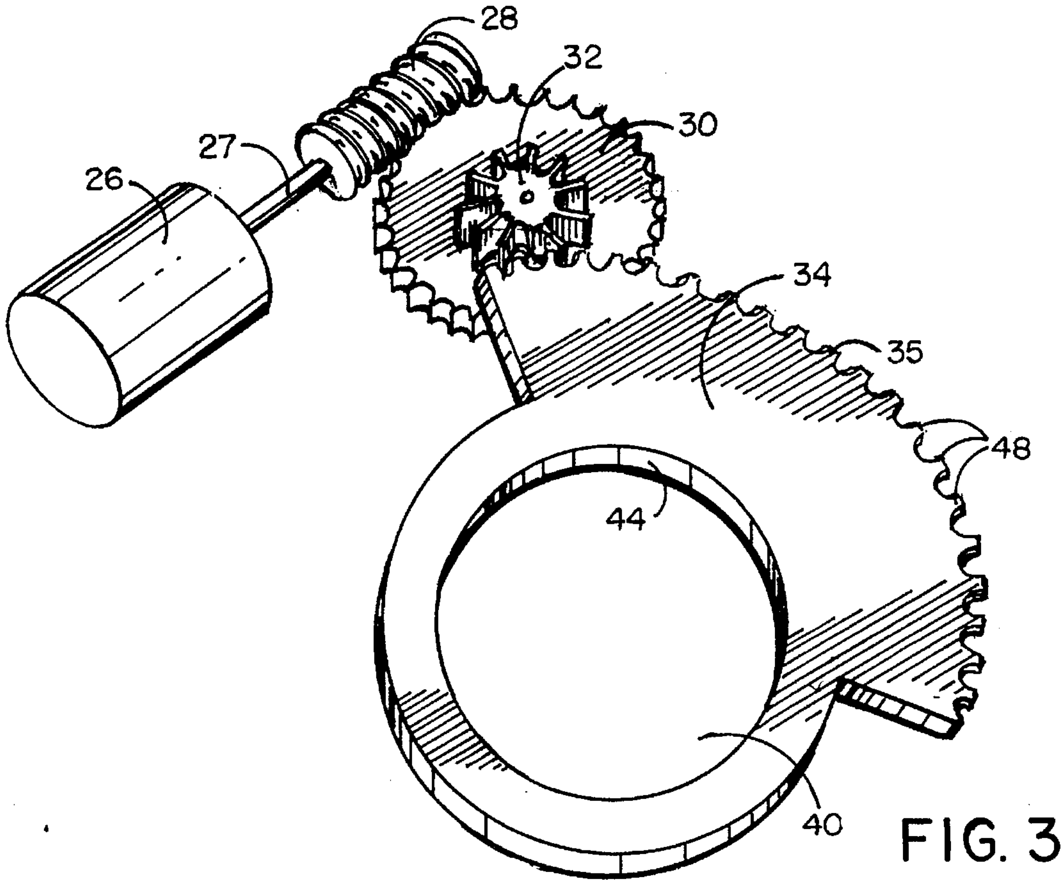
FIG. 3 illustrates a perspective view of the gears of the present invention separated from the saw.

Referring to FIGS. 2 and 3, power saw 10 is shown with circular saw blade 12 removed from main saw assembly 11 to expose the interior components of the present invention. A small electric motor 26 is attached at the first end of drive shaft 27 which extends to, and rotates, worm gear 28 which is attached at the second end of drive shaft 27. The rotation of worm gear 28, in turn, rotates gears 30, 32 and 34 to rotate movable guard 14 at desired times during operation of power saw 10. Worm gear 28 rotates and engages first drive gear 30 which, in turn, rotates smaller second drive gear 32 which is axially aligned with, and mounted to, first drive gear 30. Second drive gear 32 engages and rotates guard gear 34 which is rotatably positioned on the backside of movable guard 14. Guard gear 34 has a toothed section 35 with teeth 48, as seen in FIG. 3. Toothed section 35 is located only on one side of guard gear 34 to prevent the guard gear from hitting the material being cut when movable guard 14 is rotated to its open second position at desired times during operation of power saw 10. As seen in FIG. 3, guard gear 34 has opening 40 defined therein adjacent to toothed section 35. Annular ring 44 is raised above and around opening 40. Annular ring 44 further includes indentation 46 defined on its outer circumference which is located in the general area of toothed section 35 of guard gear 34 as seen in FIG. 7. Opening 40 on guard gear 34 is axially aligned with central opening 15 of movable guard 14.

Figure 4:
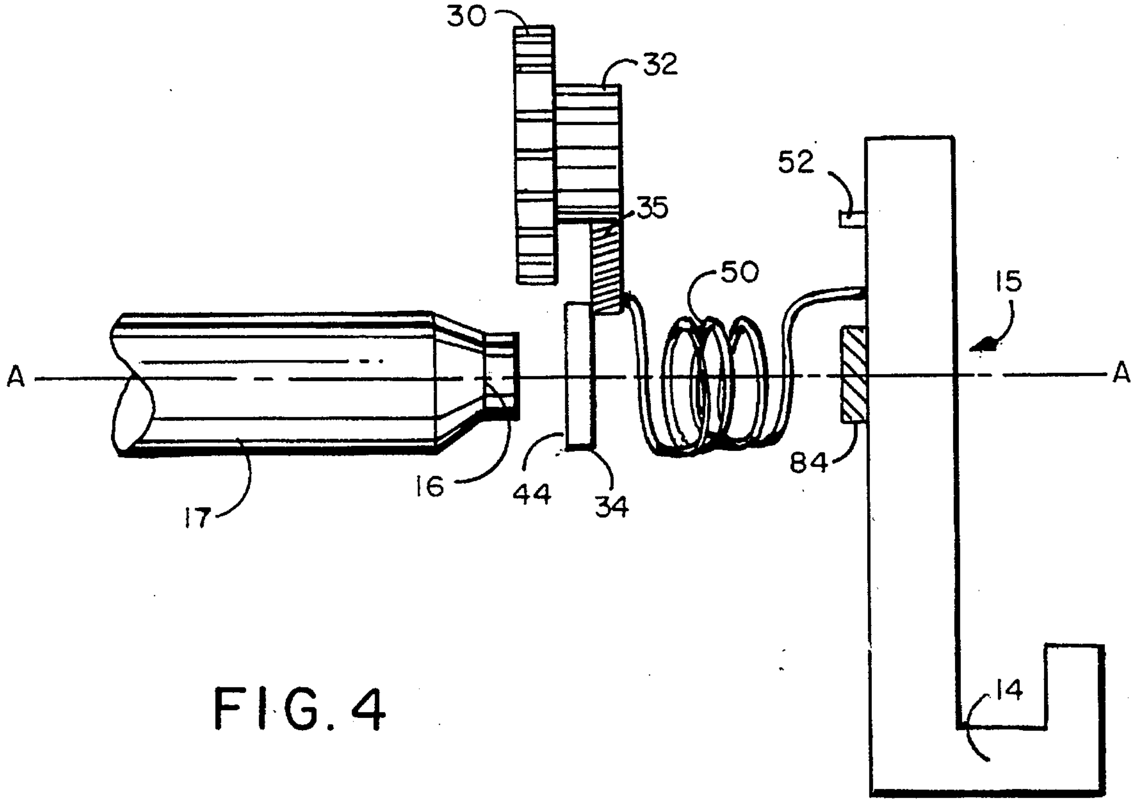
FIG. 4 illustrates a front end cutaway view of the radial alignment of the movable guard and guard gear along line A—A.

FIG. 4 shows a front end cutaway view of the alignment of guard gear 34 with movable guard 14 and with central axis 16 of spindle 17 along line A—A. Coil spring 50 is positioned between guard gear 34 and movable guard 14. One end of coil spring 50 is mounted to movable guard 14; the other end, to guard gear 34. When guard gear 34 returns to its closed mode position, it tensions coil spring 50. When there is no workpiece being cut and therefore nothing to hold movable guard 14 open, tensioned coil spring 50 is used to return movable guard 14 to its closed-mode first position. Pin 52 is mounted on the backside of movable guard 14 and is pushed against by guard gear 34 to rotate movable guard 14 from its closed-mode first position to its open mode second position at which point movable guard 14 engages first limit switch 36 as described fully below.

Returning to FIG. 2, the interior of main saw assembly 11 contains a pair of limit switches 36 and 38. First limit switch 36 is positioned above worm gear 28 and drive shaft 27 inside the U-shaped channel of fixed guard 25, not seen in FIG. 2. Second limit switch 38 is positioned adjacent to, and slightly down from, spindle 17 and is adapted to contact annular ring 44 of guard gear 34.

Figure 5:
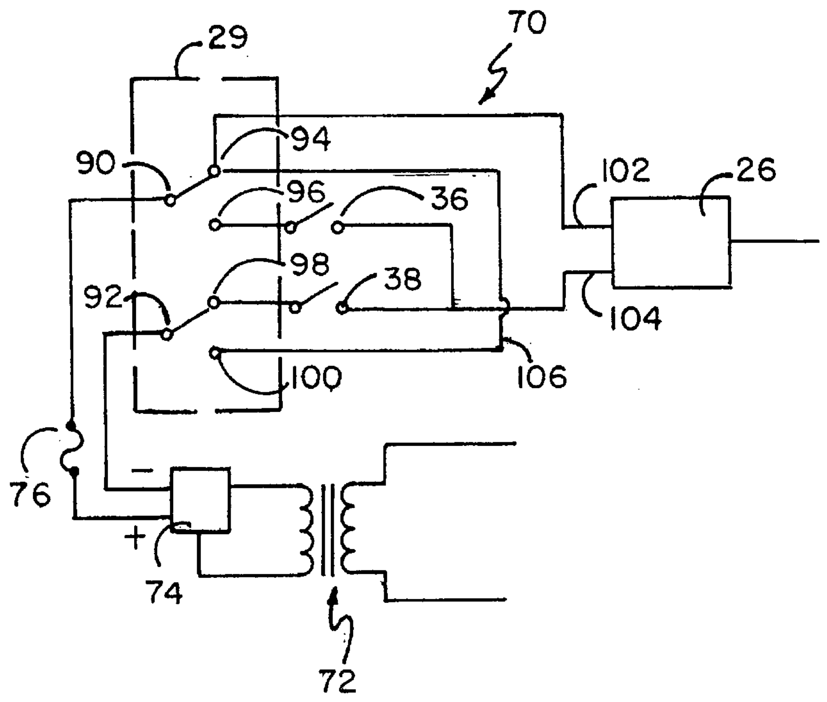
FIG. 5 illustrates a schematic drawing of the electric activation means of the present invention.

FIG. 5 illustrates a schematic view of the electric activation means 70 of the present invention in the closed-mode first position. First and second limit switches 36 and 38, along with the double pole single throw switch 29 comprises part of the activation means shown in FIG. 5. Voltage from the exterior power supply or power cord, not shown, of saw 10 passes through transformer 72 where it is converted to 12 volts AC from the original 110 voltage. Rectifier 74 is electrically connected to transformer 72. Fuse 76 is connected to rectifier 74 and is wired to double pole single throw switch 29 on handle 20 of power saw 10. Button 29 is a double pole single throw switch and is wired to electric motor 26 through first and second limit switches 36 and 38. The double pole single throw switch 29 has first and second poles 90 and 92 electrically connected to the exterior power supply through rectifier 74. In the mode shown being the unthrown position, first pole 90 is connected by one contact of the single throw double pole switch 29 to first contact 94 which directs the "+" portion of the current to first pole 102 of electric motor 26. Second pole 92 is connected by the other contact of the single throw double pole switch 29 to third contact 98 which, because second limit switch 38 which is in line therewith is open, cannot direct the "–" current to second line 104 of electric motor 26. As movable guard 14 is in its closed-mode first position, indentation 46 aligns with second limit switch 38, causing that switch to be open which action prevents current from passing through to motor 26.

In operation of power saw 10, movable guard 14 is originally located in its closed-mode first position below base member 18 as saw 10 and blade 12 start to cut into a piece of material. Guard 14 can be moved by the material out of the way of saw blade 12 and will return to its closed position by action of coil spring 50. If during the cutting of the material, progress becomes difficult because of movable guard 14 interfering with the forward movement and cutting of power saw 10, double pole single throw switch 29 can be pushed to activate the double pole single throw switch thereof. This activation causes first pole 90 to then be connected by the contact of the double pole single throw switch 29 to second contact 96 which, in turn, directs the positive current through closed first limit switch 36 along second line 104 to electric motor 26. At the same time second pole 92 is interconnected by the other contact of the double pole single throw switch 29 to fourth contact 100 which interconnection directs the negative current along line 106 to first pole 102 to electric motor 26. This completion of the current circuit drives electric motor 26 forward. Motor 26 rotates drive shaft 27 and worm gear 28 which rotation, in turn, causes the rotation of first and second drive gears 30 and 32, respectively, and guard gear 34 which strikes and moves pin 52 on movable guard 14 as seen in FIG. 7. Movable guard 14 rotates upward and above base member 18 into the. U-shaped channel of fixed guard 25. Movable guard 14 has a rotational path and continues to rotate upwards until it strikes and opens first limit switch 36, thereby breaking the circuit and stopping the movement of guard gear 34 which, in turn, holds movable guard 14 in the open position, exposing blade 12. The material can now be cut without interference from movable guard 14. Upon releasing the button of double pole single throw switch 29 which action causes the contacts of the double pole single throw switch 29 to move into the position as shown in FIG. 5 where first pole 90 is interconnected to first contact 94, directing the positive current through first pole 102 to motor 26; and second pole 92 contacts third contact 98. The current will continue through second limit switch 38 which is closed because indentation 46 in annular ring 44 has been rotated away from second limit switch 38, thereby closing second limit switch 38 and directing the negative current from third contact 98 through closed second limit switch 38 along second line 104 to motor 26. This completes the circuit to the motor with the polarity of the current being reversed so that the motor runs in reverse, driving guard gear 34 downward until indentation 46 in annular ring 44 aligns with second limit switch 38, thereby causing second limit switch 38 to open which, in turn, opens the circuit and stops the rotation of motor 26 when movable guard 14 is in its closed-mode first position. The return of guard gear 34 to its closed-mode first position tensions coil spring 50 extending between movable guard gear 34 and movable guard 14, as seen in FIG. 4. This spring tensioning allows movable guard 14 to be moved by hand, if desired, with coil spring 50 returning it to the closed-mode first position when movable guard 14 is released.

FIG. 7 provides a view of the backside of movable guard 14 with guard gear 34 in place. Movable guard 14 has raised lip 84 on its backside over which guard gear 34 is rotatably placed. Raised lip 84 allows guard gear 34 to be capable of spinning independently on movable guard 14 which independent rotation allows movable guard 14 to be manually raised without activating electric activation means 70. Additionally, guard gear 34 can return to its first position while movable guard 14 is still being held up by the material being cut if the button of double pole single throw switch 29 is released before the cutting of the material is finished.

FIG. 7 also provides a clearer view of indentation 46 on the annular ring 44 of guard gear 34. Indentation 46 operates to open second limit switch 38 as the trigger of second limit switch 38 rides along the outer circumference of annular ring 44 and is urged into indentation 46 to open second limit switch 38 when they are aligned.

Pin 52, which guard gear 34 pushes to raise movable guard 14, is also clearly seen in FIG. 7.

Although the present invention has been described with reference to particular embodiments, it will be apparent to those skilled in the art that variations and modifications can be substituted therefor without departing from the principles and spirit of the invention.

I claim:

1. A movable power circular saw guard apparatus for manually controlled power saws operating on an external electric power supply of the type having a main saw assembly including a saw motor, a fixed guard covering the upper portion of a saw blade driven by said saw motor, said apparatus supported by a handle, comprising:

a spindle having a central axis extending from said saw motor on which spindle said saw blade is mounted;

a movable guard rotatably mounted around said central axis of said spindle, said movable guard having a closed first position and an open second position, said movable guard having a rotational path;

a drive shaft having a first end and a second end;

a drive motor connected to said first end of said drive shaft;

a first drive gear;

a worm gear attached at said second end of said drive shaft, said worm gear rotatably engaging said first drive gear;

a second drive gear axially aligned and mounted on said first drive gear;

a guard gear engaged with said second drive gear, said guard gear axially aligned with, and rotatably positioned on said movable guard, said guard gear movable from a first position to a second position;

a coil spring having a first end and a second end, said first end attached to said movable guard and said second end attached to said guard gear;

means for engaging said guard gear with said movable guard;

activation means electrically connected to said external power supply and said drive motor for driving said drive shaft to rotate said worm gear and said first and second drive gears to cause said guard gear to engage and rotate said movable guard from said closed first position to its second position; and means for directing said activation means to reverse direction to cause said movable guard to move in a reverse direction to return said movable guard to said movable guard's first position.

2. The saw guard apparatus of claim 1 wherein said guard gear includes:

an annular ring integrally formed thereon, said annular ring having an outer circumference and said guard gear having a toothed section defined therearound, said annular ring having an indentation defined in said outer circumference.

3. The saw guard apparatus of claim 1 wherein said activation means comprises:

a first limit switch electrically connected to said drive motor, said first limit switch having an "on" and an "off" mode;

a second limit switch electrically connected to said drive motor, said second limit switch having an "on" and an "off" mode; and a double pole single throw switch having a first pole electrically connected to a pole of said external power supply and a second pole electrically connected to a different pole of said external power supply.

4. The saw guard apparatus of claim 3 wherein said first limit switch in an "on" mode is positioned in said rotational path of said movable guard and wherein said first limit switch is turned "off" when said movable guard contacts said first limit switch when said movable guard moves to its second position.

5. The saw guard apparatus of claim 3 wherein said second limit switch is positioned in an "on" mode when in contact with said annular ring and turns "off" when aligned with said indentation.

6. The saw guard apparatus of claim 5 wherein said movable guard has a backside and wherein said means for engaging said guard gear to said movable guard comprises a pin mounted to said backside of said movable guard, said pin adapted to be engaged by said guard gear when said guard gear moves to its second position.

7. The saw guard apparatus of claim 6 wherein said double pole single throw switch in a first position interconnects said external power supply in a polarity to said drive motor through said first limit switch when said movable guard is in its closed first position and said guard gear is in its first position with said first limit switch in an "on" mode allowing the electric power supply to pass to said drive motor, causing said drive motor to rotate said guard gear and, in turn, said movable guard to its open second position, striking said first limit switch and turning it to its "off" mode, and stopping the electric power supply to said drive motor; and said double pole single throw switch when in a second position by manual deactivation thereof, causes said electric power supply to pass through said second limit switch to said drive motor in reverse polarity to reverse the direction of rotation of said drive motor to drive said guard gear back to its first position and to allow said movable guard to rotate to its closed first position, said guard gear when in its first position aligning said indentation in said annular ring with said second limit switch to turn off said second limit switch and stop the passage of the electric power supply to said drive motor.

8. A method of moving the movable guard of a circular saw having a blade, comprising the steps of:

directing electric power to a drive motor positioned adjacent to said blade;

driving a worm gear by said drive motor;

rotating a first drive gear by said worm gear;

rotating a second drive gear axially attached to said first drive gear;

driving a guard gear by engagement with said second drive gear to rotate said movable guard from a closed first position to an open second position;

ceasing the electric power to said drive motor when said movable guard is in its open second position;

changing the polarity of the electric power to said drive motor when it is desired to close said movable guard;

directing the electric power to said drive motor to drive it in a reverse direction;

driving said guard gear in said reverse direction by said drive motor to allow said movable guard to be rotated to its closed first position by a spring attached thereto; and stopping the electric power to said drive motor.

* * * * *